Jan. 5, 1937. R. E. KINKEAD 2,066,569
MEANS AND METHOD FOR WELDING STRIPS END TO END
Filed Oct. 29, 1935 4 Sheets-Sheet 1
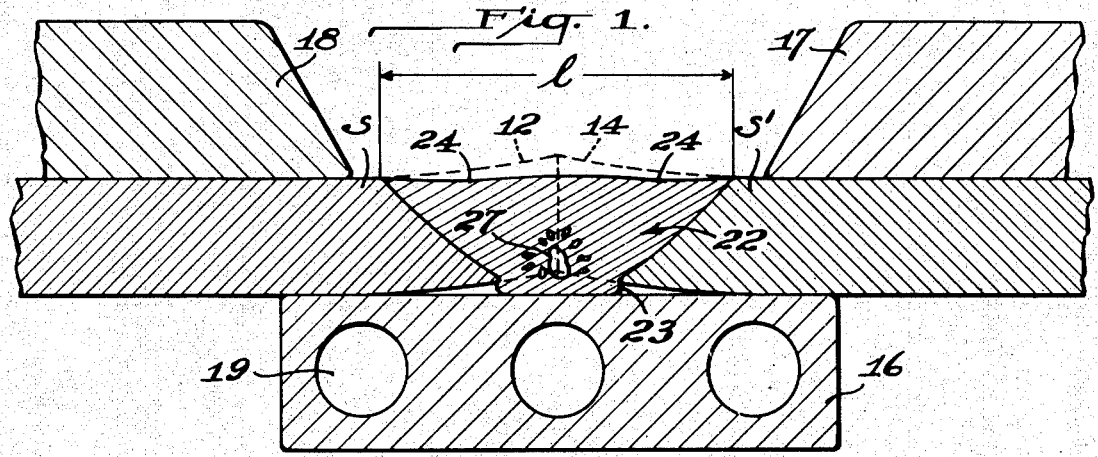
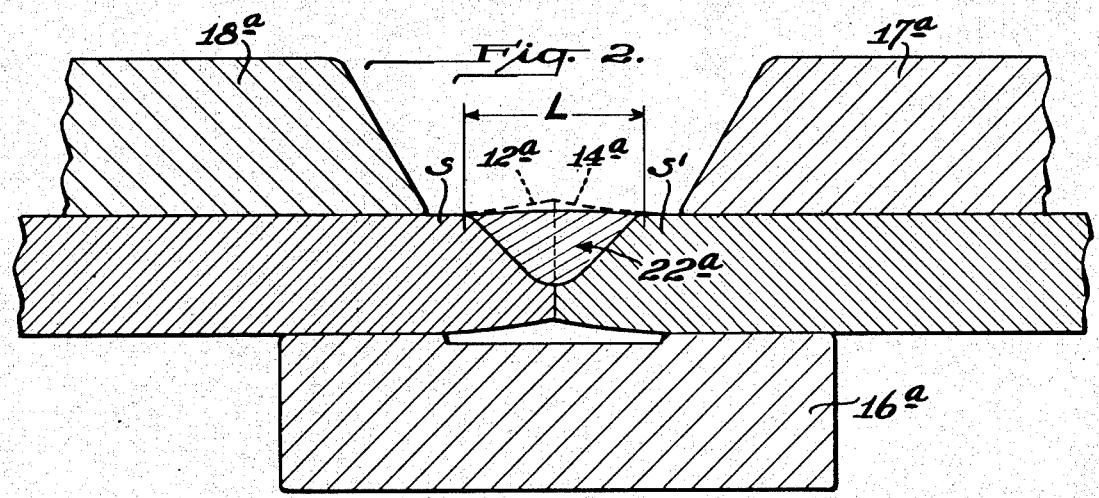
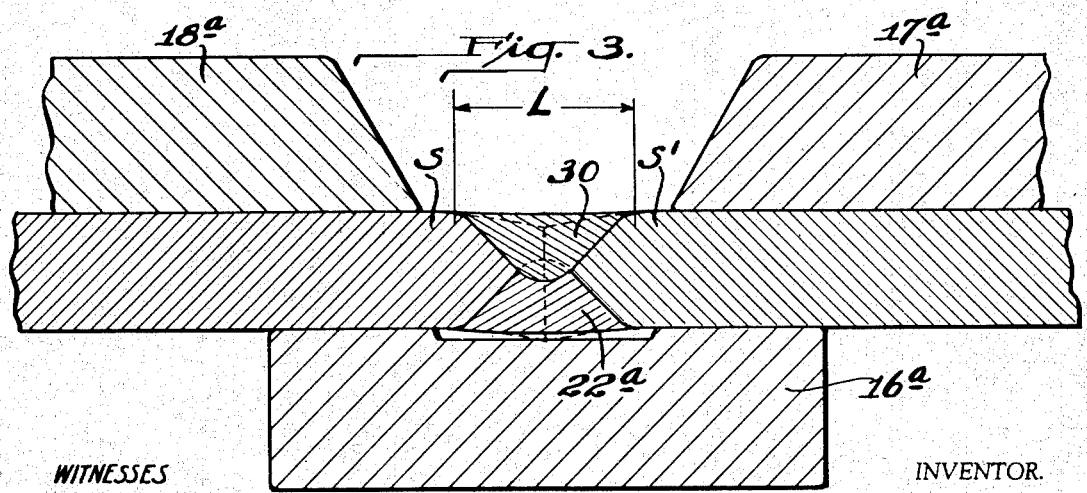
WITNESSES
A B Wallace
E. O. Johns
INVENTOR.
Robert E. Kinkead
BY Brown, Critchlow & Flick
his ATTORNEYS

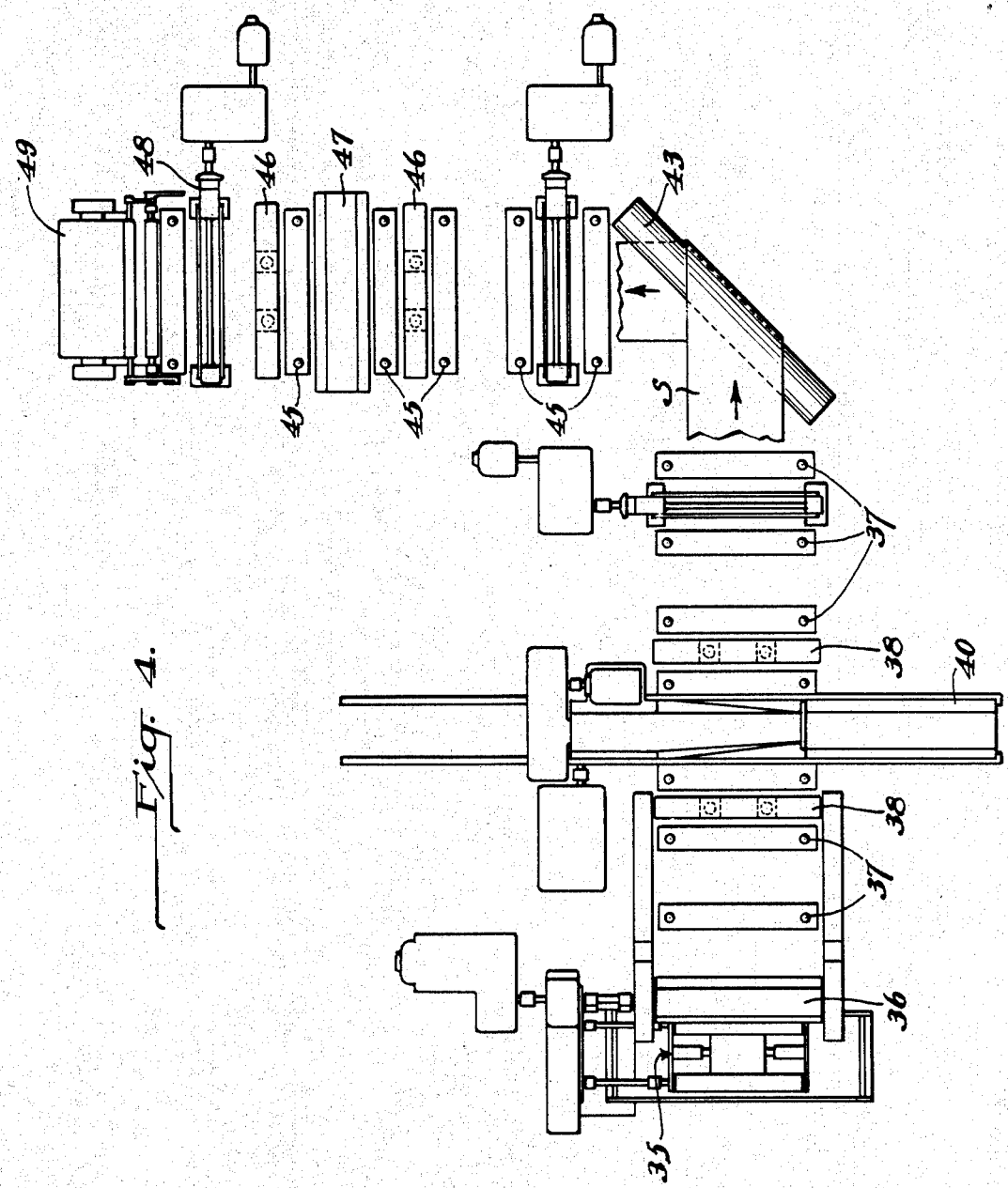

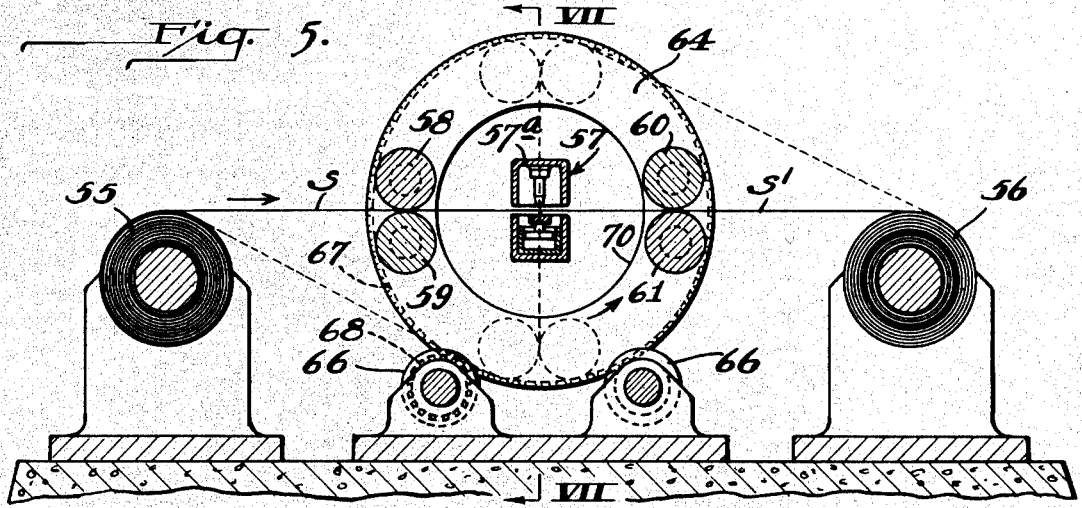
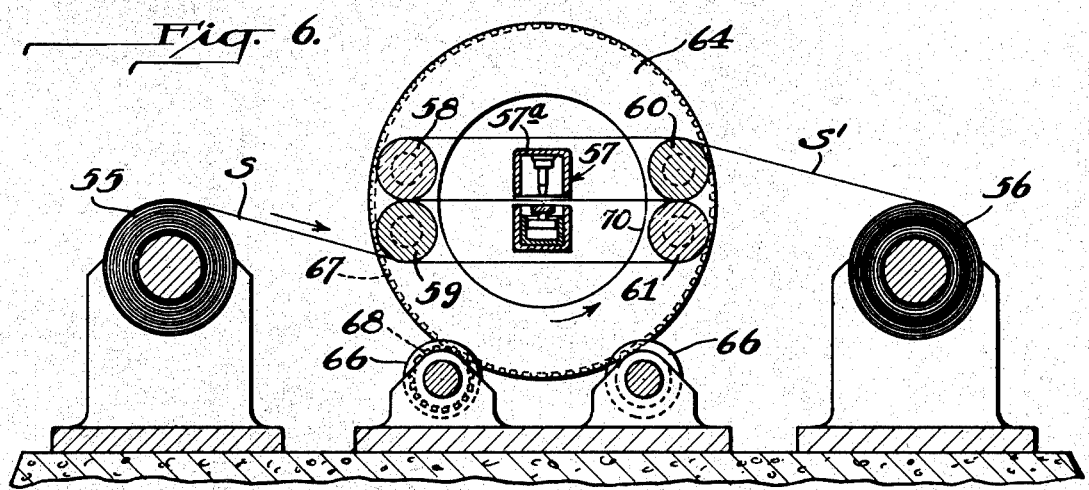
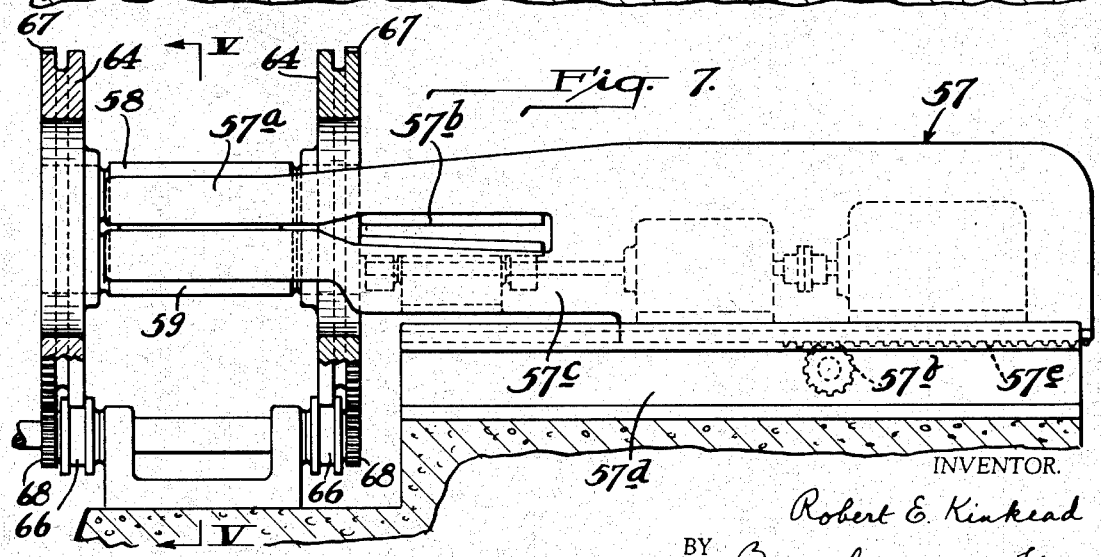

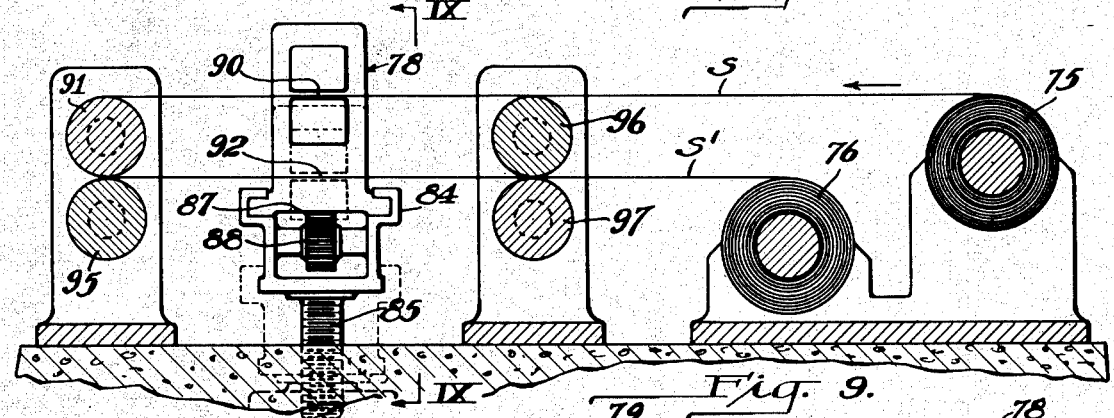
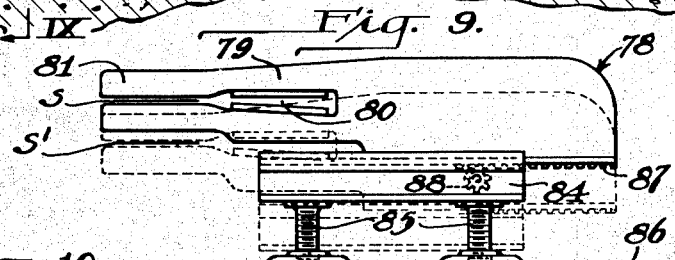
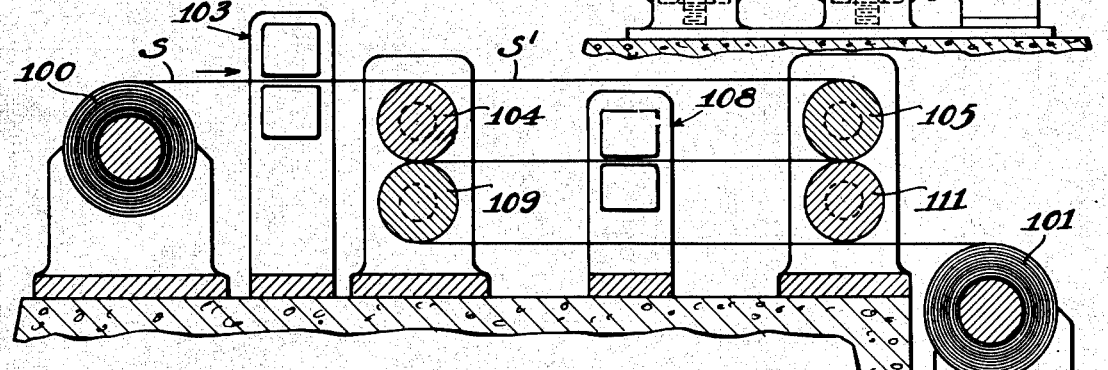
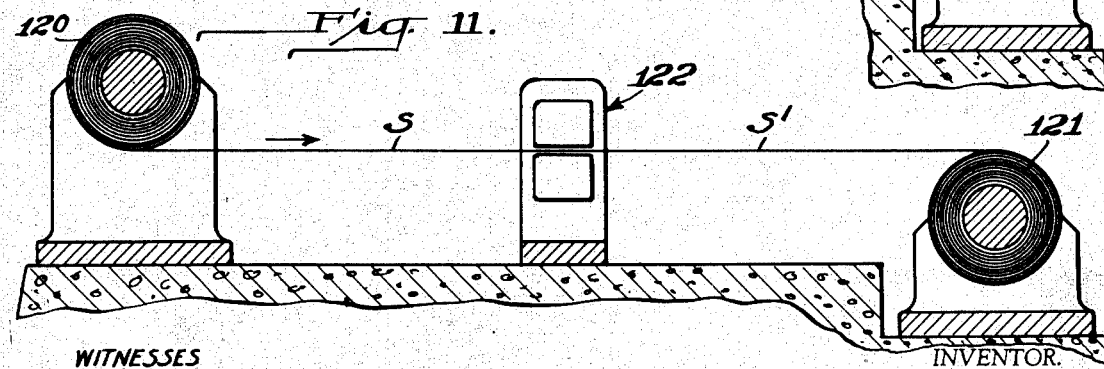

Patented Jan. 5, 1937

2,066,569

UNITED STATES PATENT OFFICE 2,066,569

MEANS AND METHOD FOR WELDING STRIPS END TO END

Robert E. Kinkead, Cleveland, Ohio

Application October 29, 1935, Serial No. 47,236

15 Claims. (Cl. 113—59)

This invention relates to the manufacture of metal strip and more particularly is concerned with improved means and methods for positively welding strip end to end in production to form a continuous length.

Coryell Patent No. 1,940,939 broadly discloses and claims the method of welding metal strip end to end with associated cold rolling operations. Making the strip continuous eliminates roll marks caused by the fish-tail ends of an ordinary short strip passing through the mills, facilitates more continuous rolling, and generally improves the production and efficiency of the strip mills.

The Biggert and Buente application Serial No. 34,912, filed August 6, 1935, and entitled "Means and methods for making strip", comprises an improvement upon the Coryell method and provides particularly apparatus and methods for welding the strip end to end in commercial production operations. A fusion welder is employed, as it has been found that fusion welding apparatus is ordinarily much less expensive than flash or resistance welding apparatus. Moreover, a fusion welder is easier to install and operate, and at the same time the resulting weld need not have the excess flash metal trimmed off as no flash is formed.

However, in fusion welding as ordinarily practiced to fasten strip ends together the welding is done against a chill bar and very often the chilling action of the bar, or other conditions encountered in welding completely through the strip, as for example scale, serves to trap gas in the weld. This is highly objectionable due to the likelihood of weld failure since the strip is generally considerably reduced in thickness by subsequent rolling which thins out the weld and renders the gas pockets a distinct source of weakness. While the usual fusion type weld as described in the Biggert and Buente application is quite satisfactory for many conditions, it may be desirable to have a more positive weld between the strips when they are to be subjected to a severe rolling operation with the strip being pulled under tension by the rolls.

The present invention is concerned with improved apparatus and methods of more positively welding the strip ends together without the formation of gas pockets and the invention comprises an improvement or addition to the disclosure of the Biggert and Buente application.

More particularly it is an object of the present invention to avoid and overcome the foregoing and other difficulties attending the use of prior processes and apparatus by the provision of improved means and methods for securely welding metal strip end to end to form a continuous length.

Another object of the invention is to provide means and methods for doubly welding strips end to end with each weld extending not less than half-way through the strip from opposite sides.

Another object of the invention is to provide apparatus adapted under production conditions to weld strips end to end with the strip being passed to a welder where the strip is initially welded from one side and then passed through means which turn the strip over with other or the same welding means operating to complete the weld again from the top side of the strip.

The foregoing and other objects of the invention are achieved by providing apparatus which includes means for supporting the strips in position to be welded end to end from the upper side with means for turning and supporting the strip in a position to be welded from the other side. Mechanism for welding the strips together from the top side in both the positions named is incorporated in the apparatus.

The foregoing and other objects of the invention are also achieved by my method of welding metal strips end to end to form a continuous strip which method comprises welding the strip ends together from the upper side, turning the partially connected ends over and completing the weld from the then top side.

In the drawings Fig. 1 is a transverse cross-sectional view of the strip weld as formed heretofore; Fig. 2 is a transverse cross-sectional view through a typical weld as partially completed following the principles of the present invention; Fig. 3 is a view similar to Fig. 2 but with the strip turned over and with the weld completed; Fig. 4 is a plan view of one embodiment of apparatus for practicing and incorporating the features of my invention; Fig. 5 is a vertical longitudinal section of a second form of apparatus for practicing and embodying the invention; Fig. 6 is a view similar to Fig. 5 but illustrates the apparatus in position for the second or finishing weld; Fig. 7 is a transverse vertical sectional view taken on line VII—VII of Fig. 5; Fig. 8 is a vertical longitudinal sectional view through apparatus embodying another modification of the invention; Fig. 9 is a transverse vertical cross-sectional view taken on the line IX—IX of Fig. 8 but on a smaller scale; Fig. 10 is a vertical longitudinal sectional view of still another form of the invention; and Fig. 11 is a vertical longitudinal sectional view of another modification of the invention.

The principles of the invention as well as important features of its advance over the prior art will be understood from a study of Figs. 1, 2 and 3 of the drawings which illustrate respectively the prior art practice, the partial weld, and finished weld of the present invention. Referring to Fig. 1 letters s and s' indicate the ends of the strips to be progressively welded together with a butt joint and the dotted lines marked 12 and 14 indicate the position of the strip ends just ahead of but subjected to the application of the welding heat as the heat and other factors cause the strip ends to expand and rise from their normal flat clamped position. As fully explained in the Biggert and Buente application the crop ends of the strips s and s' are sheared off preferably with identical cuts so that the ends of the strips are quite similar and adapted for a progessive butt welding operation. The strip ends are clamped between a chill bar 16 and clamps 17 and 18 which are operated by suitable means (not shown) to hold the ends of the strips s and s' down against the chill bar 16 which may be cooled internally as by fluid passing through passages 19 therein. However, the clamps 17 and 18 must be spaced from the ends of the strips a sufficient distance to allow the weld to be formed.

In the known practice the ends of the strips were then welded together by a fusion method which normally includes welding by multiple tip gas, atomic hydrogen or the carbon arc. In fusion welding of this character the metal at the ends of the strips is melted down and flows together to form the weld indicated as a whole by the numeral 22. Since the ends of the strips s and s' are not ordinarily in contact with the chill bar 16 just ahead of welding as above explained, the molten metal forming the weld runs down and forms a projecting bead 23. At the same time the molten metal is quite apt to sag somewhat below the surface of the ends of the strips s and s' as shown at 24 so that the resulting weld usually forms a distinct offset, kink or bump in the continuous strip. Thus subsequent rolling operations on the strip are difficult and are apt to result either in scarring of the mill rolls or in extra severe work on the weld itself which tends to weaken it.

The most objectionable feature about the old fusion weld, as just described, is that in casting against a chill bar, such as the bar 16, the molten metal on freezing generally traps gas in the weld near the chill bar and this gas forms pockets indicated at 27. When the strip is reduced in thickness after welding, for example, up to ten times or more, the weld is naturally elongated and reduced in thickness so that the gas pockets 27 may form holes in the strip or weld and may cause the weld to fail, particularly where the metal is rolled with a tension on the strip.

As directly distinguished from the prior type of fusion weld as just described is the new and novel fusion weld illustrated in Figs. 2 and 3. In these views the strip ends are marked as S and S' and clamps 17a and 18a are employed to hold the ends of the strips against a backing bar 16a which is not, however, a chill bar but which is normally raised into engagement with the ends of the strips and to provide a foundation against which the strip ends are held by the clamps 17a and 18a as more fully described in the Biggert and Buente application.

The clamped ends of the strips S and S' are welded together by a fusion welding process which may be of any known type, as, for example, multiple tip gas, carbon arc or atomic hydrogen, with the apparatus resembling that disclosed in the Biggert and Buente application. The welding process is done in two steps as illustrated in Figs. 2 and 3. As seen in Fig. 2, the weld initially made to connect the strip ends is shown at 22a, and it extends not less than halfway but not entirely through the strip. The positions of the strip ends before welding are shown by the dotted lines 12a and 14a, and it will be seen that the ends are not curved up as far off the bar 16a as those shown in Fig. 1 which is because the clamps can be and are placed closer to the ends of the strips.

Since the metal of the weld is not chilled by a chill bar but has its heat dissipated evenly through the metal of the strips surrounding the weld, there is no abrupt chilling or freezing of the welded metal which is thought to cause entrapment of gas or the formation of pockets in the weld.

The weld is completed, as shown in Fig. 3, by turning over the partially connected strips and completing the weld from the then top side of the strip. The final weld is indicated by the numeral 30, and it will be seen that the two welds 30 and 22a overlap each other somewhat at their most inward points. Thus a very positive connection between the strip ends is achieved without the formation of gas pockets and without distorting the weld so that a kink or offset is formed which is objectionable in subsequent rolling.

An important feature of the double weld just described is that the length of the weld longitudinally of the strip is materially reduced as will be evident by comparing the dimension $l$ of Fig. 1 with the dimension L of Figs. 2 and 3. The reduction of this dimension, which might be said to be the longitudinal length of the weld, means that upon subsequent rolling the weld proper is not unduly elongated. This is very desirable where the weld is cut out and scrapped after rolling, but is likewise advantageous where the weld is not scrapped but is employed with the rest of the strip for the usual purposes. Of course, it is highly advantageous to avoid cutting out and scrapping the welds and with the improved weld of the present invention, for many purposes and by certain methods of manufacture, scrapping of the welds from the finished sheet can be eliminated.

Various types of apparatus can be employed in handling the strip before and after welding and particularly in turning the strip over so that it can be welded from above but on both sides. One embodiment of a suitable apparatus is illustrated in Fig. 4 which includes an uncoiler 35, a strip flattener 36, strip-aligning means 37, clamps 38, and a combined shear and fusion welder 40. The various parts of the apparatus specified are of the general type disclosed and claimed in the Biggert and Buente application above referred to, and hence will not be described in greater detail. The strip S passes from the shear and welder 40 which welds half-way through the strip ends from the upper side, as shown in Fig. 2, to means for turning over the strip. In the form of the invention illustrated these means include a roller 43 which is journalled so that its axis is substantially in or parallel to the normal plane of the strip but with the roller axis at 45° to the longitudinal center-line of the strip so that the strip in passing over the roller turns, as shown in Fig. 4, to present its bottom side upwardly and its upper surface downwardly. The strip may also be turned over by an appropriately shaped chute lined with rollers as will be understood. After being turned over the strip S passes to aligning means 45, clamps 46 and a welder 47, of which the aligning means and clamps may be like those shown at 37 and 38. The welder 47 is generally similar to that incorporated in the unit 40 and serves to complete the welding of the strip from the top side thereof as illustrated in Fig. 3. From the welder 47 the strip passes through pinch rolls 48 to a coil reel 49.

It should be understood that the invention contemplates welding strips end to end from both sides by a double weld with the strip being originally or subsequently handled as desired. However, since it is the usual practice to handle the strip in coils the several embodiments of the invention have been illustrated as incorporating uncoilers and coilers with the apparatus although the invention is not limited thereto for reasons just described.

In turning the strip S over after initially welding half through from the top side it is important that the unwelded side of the seam be kept at the inner side or against the surface of a turning roller. This prevents the seam from opening up as would occur if the open side of the seam were at the outside of the roller. In all of the modifications herein described it will be seen that the open side of the seam is always kept toward the roller if the strip is bent around a roller.

A modification of the invention is illustrated in Figs. 5, 6 and 7 which includes an uncoiler 55 and a coil reel 56 which carry strips S and S'. The strips S and S' are welded end to end by a fusion welder and shear unit 57 which is adapted to initially weld half through the strip ends from the top, as seen in Fig. 2, with the strips then being turned over for completion of the weld again from the top. To turn over the strips after the initial weld the strips are clamped as by rolls 58, 59, 60 and 61 which are carried at their ends by a circular frame 64. Quickly releasable driving means (not shown) may be associated with the rolls 58, 59, 60 and 61 if desired. The frame 64 is mounted upon suitable rollers 66, and means are provided for rotating the frame 64 through substantially 180° to the position shown in Fig. 6. These means may include ring gears 67 formed on the frame 64 with gears 68 engaging with the ring gears and driven in any desired manner. The frame 64 is formed with a suitable opening 70 which permits the shear and welder unit 57 to be moved into the frame to shear and weld and then out of the frame during the turning over of the strip. The shear and welder unit 57, as shown in Fig. 7, includes a welder 57a and a shear 57b mounted on a C-frame 57 slidably carried by a base 57d. A rack 57e and a pinion 57f control the position of the unit 57. Once the strip is turned over the welder unit 57 is moved back into welding position to complete the weld as shown in Fig. 3. The apparatus can include aligning means, additional clamps, flattening rollers, and the like, as more particularly illustrated and described in conjunction with the form of the invention illustrated in Fig. 4.

It will be understood that in the operation of the embodiment of the invention of Figs. 5, 6 and 7 after the welding operation has been performed on one side and completed on the other after a reversal of the surface of the strip, the frame 64 is turned back to the position shown in Fig. 5 at which time the strip-handling operations such as coiling and the like can be continued with additional strips being welded to the end of the continuous length as necessary or desirable.

Figs. 8 and 9 illustrate another form of the invention which includes an uncoiler 75 and a coil reel 76 carrying the strips S and S'. The strips are joined end to end by a welder and shear unit, indicated generally by the numeral 78, which, as best seen in Fig. 9, includes a C-frame 79 carrying a shear 80 and a welding unit 81. The entire shear and welder is slidably mounted upon a base 84 which is vertically adjustable as by the provision of screws 85 operated by a motor 86. A rack 87 and gear 88 are provided to control the lateral position of the frame 79 on the base 84. By this mounting the welder can be moved both vertically and laterally or from a position to shear and partially weld the strips end to end in its most vertical position to a lower position to complete the weld after the strip has been turned over.

As seen in Fig. 8 the strips S and S' are sheared and partially welded together (per Fig. 2) at the point marked 90 and are then carried over a roller 91 to the point 92 where the weld is completed (per Fig. 3). Additional rolls 95, 96, and 97 can be employed to assist in handling the strip, or clamps, aligning rollers and other detailed mechanism described heretofore can be incorporated in this embodiment of the invention also if desired.

In the operation of this modification it will be understood that when the weld is made at 90 the welder and shear 78 are raised on the screws 85 and then moved laterally over the strip ends on the base 84 to position the shear and then the welder over the strip ends. When the weld at 90 is completed the welder is run back on the base 84 to clear the sides of the strip and then the screws 85 are operated to drop the welder down in alignment with the strip after it is turned over. The welder is then moved in on the base 84 by operation of gear 88 and rack 87 so that the welder is in position to perform the weld at 92 which completes the securing of the strips end to end.

The modification of the invention illustrated in Fig. 10 includes an uncoiler 100 and a coil reel 101, with the strip marked S passing from the uncoiler 100 to a welding unit 103 over a roll 104 and roll 105 to a second welder 108. From the second welder 108 the strip passes over rolls 109 and 111 and to the coil reel 101. The rolls 104 and 109 and the rolls 105 and 111 may cooperate with each other to clamp or hold the strips during welding. In addition aligning rollers, clamps, strip shears, etc. may be included in the structure as will now be evident from the preceding description.

The operation of this embodiment of the invention should be understood. It comprises merely partially welding at 103 the strips end to end from the top, as shown in Fig. 2, thereafter turning the strips over, and completing the weld, per Fig. 3, by the separate welding apparatus 108 which again welds from the top. The strips may be handled as desired before and after the welding operation, but for convenience and in accordance with the usual practice are shown as being coiled.

In Fig. 11 is illustrated still another embodiment of the invention which includes a strip uncoiler 120 and a coil reel 121 with an associated shear and welder unit, designated generally by the numeral 122. The strip marked S passes from the uncoiler 120 to the shear and welding unit 122 which in accordance with the methods and apparatus heretofore described trims off the crop ends of the strips, aligns the strips with each other, and partially welds the strips together with a fusion weld which extends substantially halfway through the strips from above, as illustrated in Fig. 2 and heretofore described. The partially welded strips are then coiled on the coil reel 121, and it will be seen that the mounting of the coil reel 121 is such that if the coil is then taken and mounted upon the uncoiler 120 the side of the strip which was formerly the top will be on the bottom and vice versa. Thus, the same welder unit 122 can be employed to complete the fusion welding of the strip end to end, as seen in Fig. 3, with the strip being coiled on the coil reel 121 thereafter.

It will be recognized that the objects of the invention have been achieved by the provision of improved means and methods for progressively fusion welding metal strips end to end in continuous lengths. The resulting weld is stronger than the prior type of weld and moreover does not put a kink or offset in the strip which interferes with subsequent cold rolling. The new weld is longitudinally shorter than the old weld which is quite important in saving material. The weld is often of such character as to permit the use of the entire strip, including the welds. The welds are free from gas pockets or inclusions as normally occasioned by the use of a chill bar or welding from a single side. This renders the weld much stronger and also often permits the use of the metal of the weld for the standard strip purposes.

An important feature of my present invention is that the total time employed in welding the strip end to end by my method and apparatus as compared with prior processes and machines is not noticeably increased and in certain instances may even be decreased. This is because with the old fusion weld completely through the strip it was necessary to melt the metal down through its entire thickness and also a considerable longitudinal distance on both sides of the abutting faces of the strip, as shown in Fig. 1. This melting of a considerable amount of metal naturally takes more time than melting the metal shown at 22a in Fig. 2, for example, or the metal shown at 30 in Fig. 3. I have found that it is possible to partially weld from one side and then turn over the strip and weld from the other side, while handling the strip for example with coilers, without necessitating such a dwell for welding that the strip-handling operations are seriously interfered with. By using a plurality of jets or electrodes in my welding apparatus and only welding partially through the sheet from both sides, it is possible to perform the welding operation even on both sides of the strip relatively rapidly.

While in accordance with the patent statutes certain methods and embodiments of apparatus incorporating the features of my invention have been illustrated and described in detail, it should be understood that my invention is not limited thereto or thereby but is defined in the appended claims.

I claim:

1. Apparatus for making continuous metal strip comprising means for cutting off the crop ends of individual strips, means for fusion welding the strips end to end from above, means for aligning the strips with the cutting and welding means, means for supporting and feeding the strips to and from the cutting and welding means, means for clamping the strips before cutting and welding, means for turning over the strip after an initial weld from the top, and means for completing the welding of the strips from above.

2. In apparatus for welding strips end to end, means for supporting the strips in position to be welded from one side, means for turning and supporting the strip in a position to be welded from the other side, and means for welding the strips end to end from the top side and in the positions named.

3. Apparatus for welding metal strips end to end comprising means for fusion welding the strips end to end from above, means for aligning the strips, means for supporting and feeding the strips to and from the welding means, means for clamping the strips before welding, and means for turning over the strip after an initial weld from the top so that the strips can be welded together from both sides.

4. In apparatus for welding strips end to end, means for supporting the strips in position to be welded from one side, means for turning and supporting the strip in a position to be welded from the other side, means for welding the strips end to end from the top side and in the positions named, and means for coiling the strip after welding.

5. In apparatus for welding strips end to end, means for supporting the strips in position to be welded from one side, means for turning and supporting the strip in a position to be welded from the other side, means for welding the strips end to end from the top side and in the positions named, and means for handling the strip after welding.

6. In combination, means for handling a length of strip, means for handling a second length of strip, means for bringing the ends of the strips together in abutting end-to-end relation, means for fusion welding the ends together but only part-way through, means for turning the welded ends of the strips over, and means for relatively moving the welding means and partially welded strip ends to bring the strip ends below the welding means so that the weld of the strip ends can be completed from above.

7. In combination, means for handling a length of strip, means for handling a second length of strip, means for bringing the ends of the strips together in abutting end-to-end relation, means for fusion welding the ends together from above but only part-way through, means for turning the welded ends of the strips over, and means for completing the fusion weld from the then top side.

8. In combination, means for handling a length of strip, means for handling a second length of strip, means for fusion welding the ends together but only part-way through, means for turning the welded ends of the strips over, and means for completing the fusion weld from the then top side.

9. Apparatus for making metal strip comprising a coil box and a coil reel for handling the strip, a welder for connecting the end of the strip carried by the coil box with the end of the strip carried by the reel, said welder being of the fusion type and operating from above to weld only partly through the strip, a roller positioned between the welder and the coil reel for turning the strip over, and a second welder for completing the fusion weld by operation on the strip after it is turned over.

10. That method of welding metal strips into a continuous length which comprises shearing off the crop ends of the strips to be welded, positioning the strip ends in horizontally aligned and abutting relation, fusion welding the abutting ends together from above by a weld that extends only about half-way through the strips, turning the strips over, welding through the other half of the strips from above by fusion welding, and coiling the continuous strip so formed.

11. That method of welding metal strips into a continuous length which comprises positioning the strip ends in horizontal, aligned and abutting relation, fusion welding the abutting ends together from above by a weld that extends only about half-way through the strips, turning the strips over, welding through the other half of the strips from above by fusion welding, and coiling the continuous strip so formed.

12. The method of welding metal strips end to end to form a continuous length which comprises aligning the strip ends with each other, shearing the crop ends from the strips, butt-welding the strips partly together by fusion, and completing the weld by fusion of the metal from the other side of the strips.

13. Apparatus for making metal strip comprising a coil box and a coil reel for handling the strip, a welder for connecting the end of the strip carried by the coil box with the end of the strip carried by the reel, said welder being of the fusion type and operating from above to weld only partly through the strip, a roller positioned between the welder and the coil reel for turning the strip over, and means for moving the welder to a position over the welded seam after the strip is turned over so that the weld can be completed from above.

14. Apparatus for welding metal strips end to end to form a continuous length which comprises means for handling the strips before welding, means for handling the strip after welding, means for receiving the strip from the handling means and for turning the strip to present either side upwardly, and strip welding means associated with the strip turning means so that the strips can be welded together from both sides.

15. Apparatus for making metal strip comprising a coil box and a coil reel for handling the strip, a welder for connecting the end of the strip carried by the coil box with the end of the strip carried by the reel, said welder being of the fusion type and operating from above to weld only partly through the strip, a roller positioned between the welder and the coil reel for turning the strip over, and a second welding mechanism between the roller and the coil reel for completing the weld from above.

ROBERT E. KINKEAD.